(12) United States Patent
Lee et al.

(10) Patent No.: US 9,663,002 B2
(45) Date of Patent: May 30, 2017

(54) DEVICE OF FOLDING SEAT FOR VEHICLE

(71) Applicants: Hyundai Motor Company, Seoul (KR); Kia Motors Corp., Seoul (KR); DAS CO., LTD., Gyeongju-si (KR)

(72) Inventors: Byung Jae Lee, Gunpo-Si (KR); Yong Soo Chang, Seoul (KR); Min Kyu Kim, Ulsan (KR)

(73) Assignees: Hyundai Motor Company, Seoul (KR); Kia Motors Corp., Seoul (KR); DAS CO., LTD., Gyeongju-si (KR)

( * ) Notice: Subject to any disclaimer, the term of this patent is extended or adjusted under 35 U.S.C. 154(b) by 32 days.

(21) Appl. No.: 14/552,401

(22) Filed: Nov. 24, 2014

(65) Prior Publication Data

US 2016/0046209 A1 Feb. 18, 2016

(30) Foreign Application Priority Data

Aug. 18, 2014 (KR) .................. 10-2014-0106850

(51) Int. Cl.
*B60N 2/20* (2006.01)
*B60N 2/30* (2006.01)
(Continued)

(52) U.S. Cl.
CPC ............ *B60N 2/206* (2013.01); *B60N 2/305* (2013.01); *B60N 2/3013* (2013.01);
(Continued)

(58) Field of Classification Search
CPC .......... B60N 2/305; B60N 2/304; B60N 2/36; B60N 2/366; B60N 2/487; B60N 2/3013;
(Continued)

(56) References Cited

U.S. PATENT DOCUMENTS 5,641,202 A * 6/1997 Rus .................. B60N 2/3013
296/65.09
5,738,411 A * 4/1998 Sutton .............. B60N 2/3013
297/378.12
(Continued)

FOREIGN PATENT DOCUMENTS

JP 10-129317 A 5/1998
JP 10-297332 A 11/1998
(Continued)

*Primary Examiner* — David R Dunn
*Assistant Examiner* — Tania Abraham
(74) *Attorney, Agent, or Firm* — Morgan Lewis & Bockius LLP

(57) ABSTRACT

A device of folding a seat for a vehicle may include a seat cushion disposed on a bottom of a vehicle body and rotatable by a rotation mechanism and provided with a first position fixing mechanism, a seat back rotatably disposed at a rear of the seat cushion and provided with a second position fixing mechanism, a headrest rotatably disposed at an upper portion of the seat back and fixed in position by a third position fixing mechanism disposed in the seat back, and an operation mechanism disposed in the seat back and unlocking the first position fixing mechanism to unlock the second position fixing mechanism and the third position fixing mechanism at a time of rotating the seat cushion so as to rotate the seat back and the headrest.

11 Claims, 15 Drawing Sheets

(51) Int. Cl.
*B60N 2/44* (2006.01)
*B60N 2/48* (2006.01)
*B60N 2/68* (2006.01)

(52) U.S. Cl.
CPC ........... *B60N 2/4435* (2013.01); *B60N 2/487* (2013.01); *B60N 2/68* (2013.01); *B60N 2002/447* (2013.01); *B60N 2002/4475* (2013.01)

(58) Field of Classification Search
CPC .............. B60N 2/4435; B60N 2/4855; B60N 2002/447; B60N 2002/4475
See application file for complete search history.

(56) References Cited

U.S. PATENT DOCUMENTS

| | | | |
|---|---|---|---|
| 6,192,565 B1 * | 2/2001 | Tame | B60N 2/20 297/410 |
| 6,595,587 B2 * | 7/2003 | Konishi | B60N 2/3013 296/65.01 |
| 7,059,681 B2 * | 6/2006 | Kubo | B60N 2/3013 297/335 |
| 8,496,294 B2 * | 7/2013 | Holdampf | B60N 2/2356 296/65.09 |
| 8,845,026 B2 * | 9/2014 | Kobayashi | B60N 2/3013 296/65.09 |
| 2009/0243357 A1 * | 10/2009 | Mori | B60N 2/30 297/325 |
| 2014/0015296 A1 * | 1/2014 | Ogata | B60N 2/3013 297/340 |

FOREIGN PATENT DOCUMENTS

| | | |
|---|---|---|
| JP | 2001-63420 A | 3/2001 |
| JP | 2005-104364 A | 4/2005 |
| JP | 3776200 B2 | 5/2006 |
| JP | 2009-234503 A | 10/2009 |
| KR | 10-2008-0006127 A | 1/2008 |
| KR | 10-2012-0047056 A | 5/2012 |
| KR | 10-2013-0060869 A | 6/2013 |
| WO | WO 2011/002027 A1 | 1/2011 |

* cited by examiner

DEVICE OF FOLDING SEAT FOR VEHICLE

CROSS REFERENCE TO RELATED APPLICATION

The present application claims priority of Korean Patent Application Number 10-2014-0106850 filed on Aug. 18, 2014, the entire contents of which application are incorporated herein for all purposes by this reference.

BACKGROUND OF THE INVENTION

Technical Field

The present invention relates to a device of folding a seat for a vehicle capable of simultaneously folding a seat cushion, a seat back, and a headrest by simultaneously unlocking the seat cushion, the seat back, and the headrest at the time of folding a seat.

Description of the Related Art

Generally, since a van or a recreational vehicle has an insufficient trunk space in which things may be separately received, a rear seat back is folded when bulky loads are received inside a vehicle to make a load space of a rear of the vehicle be largely secured.

By doing so, to selectively expand the load space, a rearmost seat is provided with a folding type seat which may be folded. Further, the folding type seat is applied to the rearmost seat and a front seat of a vehicle, and thus rear passengers put legs thereon to take a rest.

As illustrated in FIG. 1, the folding type seat is configured to secure the rear load space by flipping the seat cushion, folding the headrest, and folding the seat back. Here, locking members for fixing positions of the seat cushion, the seat back, and the headrest are each provided and operation levers for operating the locking members also need to be provided in plural, corresponding to the number of locking members.

As the result, a cumbersome procedure to operate the corresponding operation lever for flipping the seat cushion and each operation lever for a folding operation of the headrest and the seat back is essential.

Therefore, a need exists for a method for increasing user convenience by releasing all the locking members by operating the lever just once at the time of securing the load space of the rear of the vehicle.

The information disclosed in this Background section is only for enhancement of understanding of the general background of the invention and should not be taken as an acknowledgement or any form of suggestion that this information forms the prior art already known to a person skilled in the art.

SUMMARY OF THE INVENTION

The present invention is to provide a device of folding a seat for a vehicle capable of simultaneously folding a seat cushion, a seat back, and a headrest by simultaneously unlocking the seat cushion, the seat back, and the headrest so as to secure a load space of a rear of the vehicle.

According to various aspects of the present invention, there is provided a device of folding a seat for a vehicle, including: a seat cushion configured to be rotatably disposed on a bottom of a vehicle body and rotatable by a rotation mechanism and provided with a first position fixing mechanism for fixing a position thereof; a seat back configured to be rotatably disposed at a rear of the seat cushion and provided with a second position fixing mechanism for fixing a position thereof; a headrest configured to be rotatably disposed at an upper portion of the seat back and fixed in position by a third position fixing mechanism disposed in the seat back; and an operation mechanism configured to be disposed in the seat back and unlock the first position fixing mechanism to unlock the second position fixing mechanism and the third position fixing mechanism at a time of rotating the seat cushion so as to rotate the seat back and the headrest.

The rotation mechanism may include: a rotation linkage configured to be disposed under a front of the seat cushion and include a plurality of links; and an operation part configured to be connected to the links to provide an operating force so as to rotate the seat cushion.

The plurality of the links may include: a first link configured to have one end hinge-connected to the bottom of the vehicle body and the other end connected to a lower end of the seat cushion and be applied with an operating force of the operation part so as to rotate back and forth; a second link configured to have one end hinge-connected to the other end of the first link and the other end extending from a lower end of the seat cushion to be fixed; and a third link configured to have one end hinge-connected to the bottom of the vehicle body and the other end connected to the other end of the second link and rotate along with the rotation of the first link to support the second link.

The operation part may include a spring member providing an elastic force to rotate the seat cushion forward.

The operation mechanism may include: a base bracket configured to be fixed inside the seat back; a latch bracket configured to be hinge-connected to an upper end of the base bracket and be connected to latch cables extending from the second position fixing mechanism and the third position fixing mechanism, respectively, which are provided in the seat back; a release bracket configured to be hinge-connected to a lower end of the base bracket and be connected to a release cable extending from the seat cushion to rotate by a pulling force of the release cable when the seat cushion rotates; and a return bracket configured to be hinge-connected to an upper end of the release bracket and contact the latch bracket at the time of the rotation of the release bracket.

The base bracket may be provided with a guide extending along a rotation radius of the release bracket and the release bracket may rotate along a formation path of the guide.

One end of the release bracket may be connected to the release cable extending from the seat cushion and the other end thereof may be connected to a recovering member fixed to the base bracket.

The release bracket may be provided with a protruded stopper to limit the rotation of the return bracket in other direction.

An upper end of the latch bracket based on a hinge point may be connected to the latch cable extending from the second position fixing mechanism and the third position fixing mechanism and a lower end thereof may extend to contact the return bracket.

The seat back may be rotatably disposed by the hinge bracket and may be provided with a return cable, of which one end is connected to the hinge bracket and is connected to the hinge bracket to pull the seat back when the seat back returns to an original position of the seat back and the other end is connected to the headrest to pull the headrest, when the seat back returns to the original position of the seat back, to return the headrest to an original position of the headrest.

The hinge bracket may be provided with a flange rotating simultaneously with the seat back and one end of the return cable may be connected to the flange and the other end thereof may be connected to a rotation lever of the headrest.

The seat cushion may be provided with an operation part to lock or unlock the first position fixing mechanism and the operation part may be connected to the first position fixing mechanism through an operation cable.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
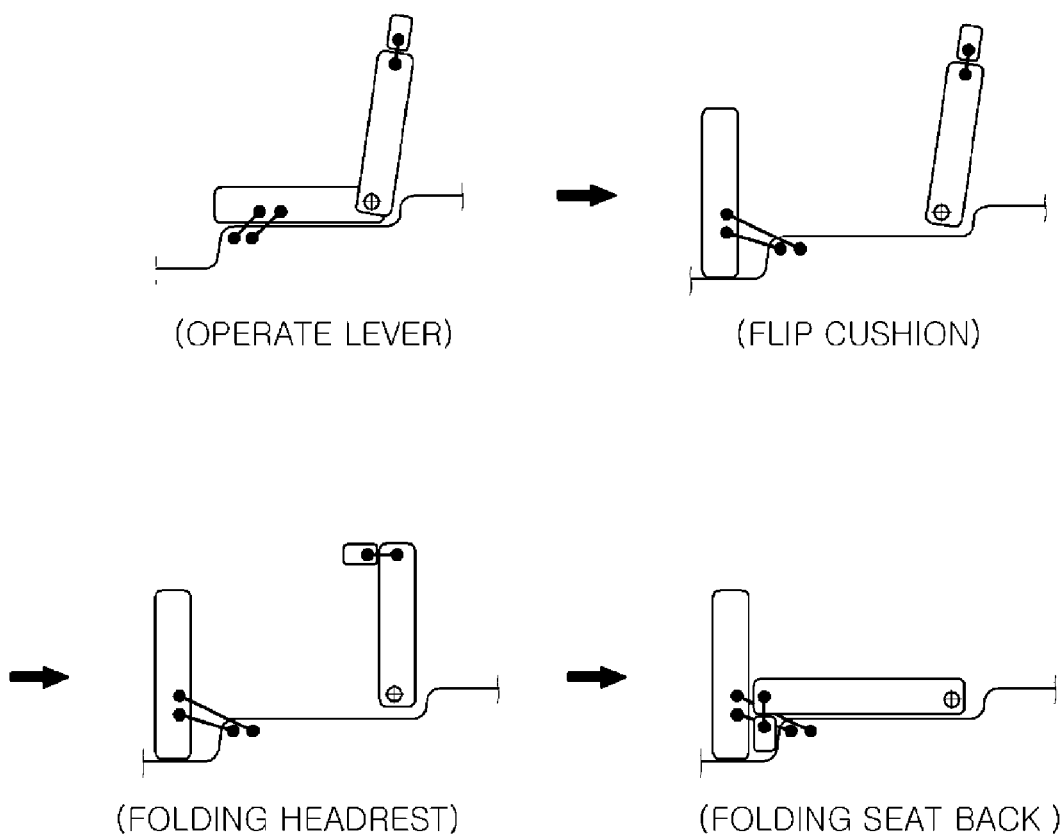
FIG. 1 is a diagram for describing seat folding according to the related art.
Figure 2:
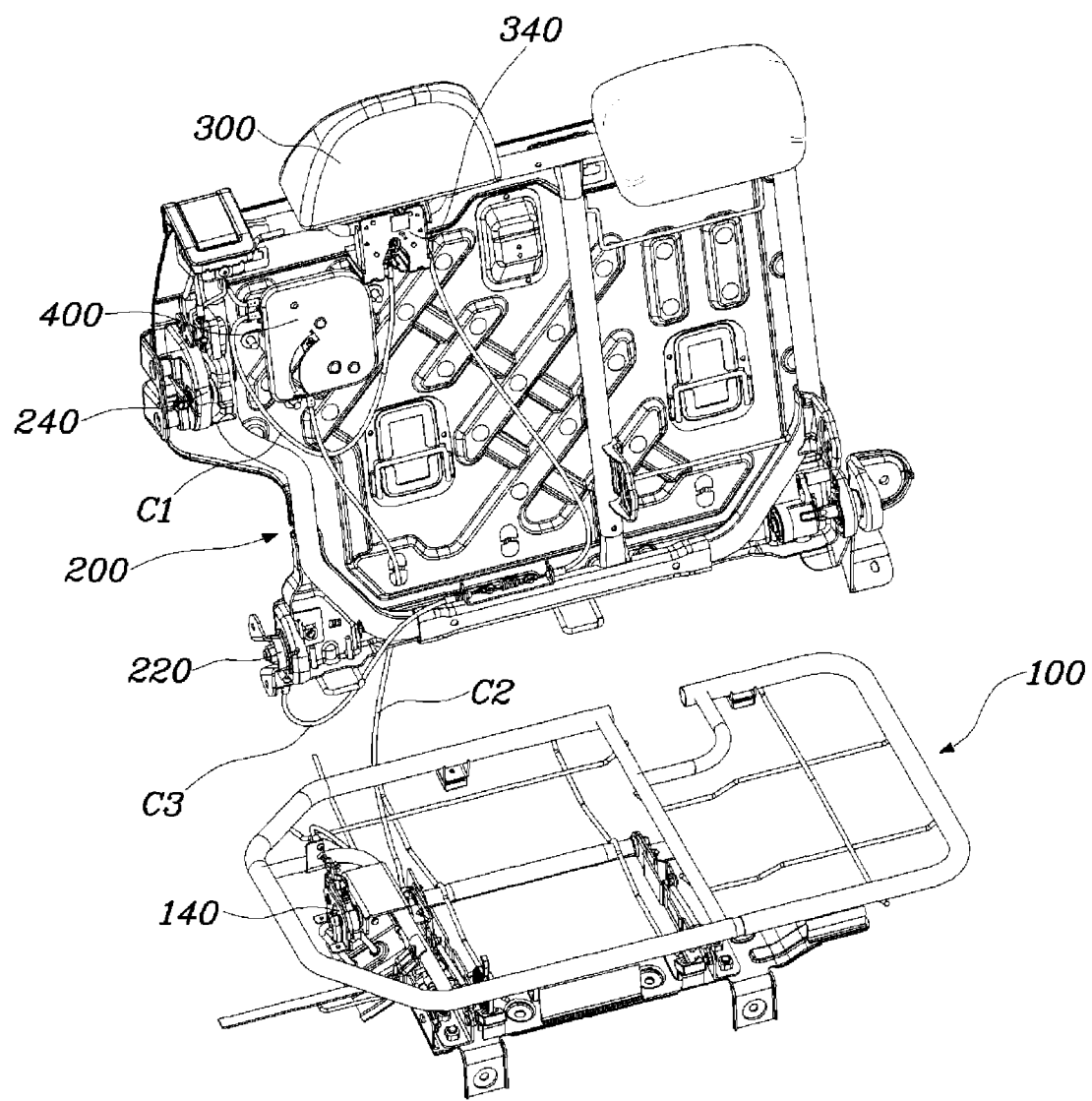
FIG. 2 is a perspective view of an exemplary device of folding a seat for a vehicle according to the present invention.
Figure 3:
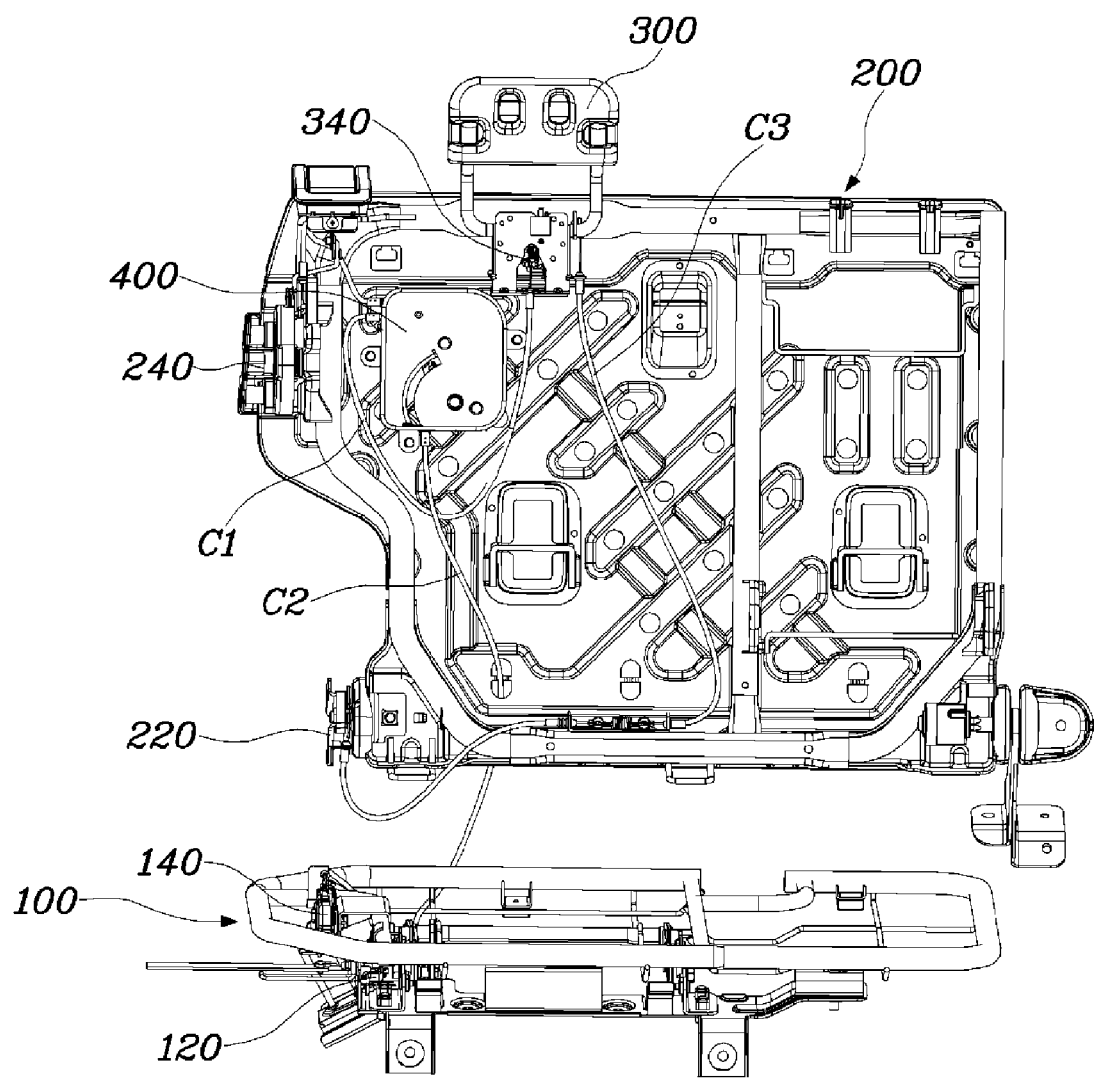
FIG. 3 is a front view of the device of folding a seat for a vehicle illustrated in FIG. 2.
Figure 4:
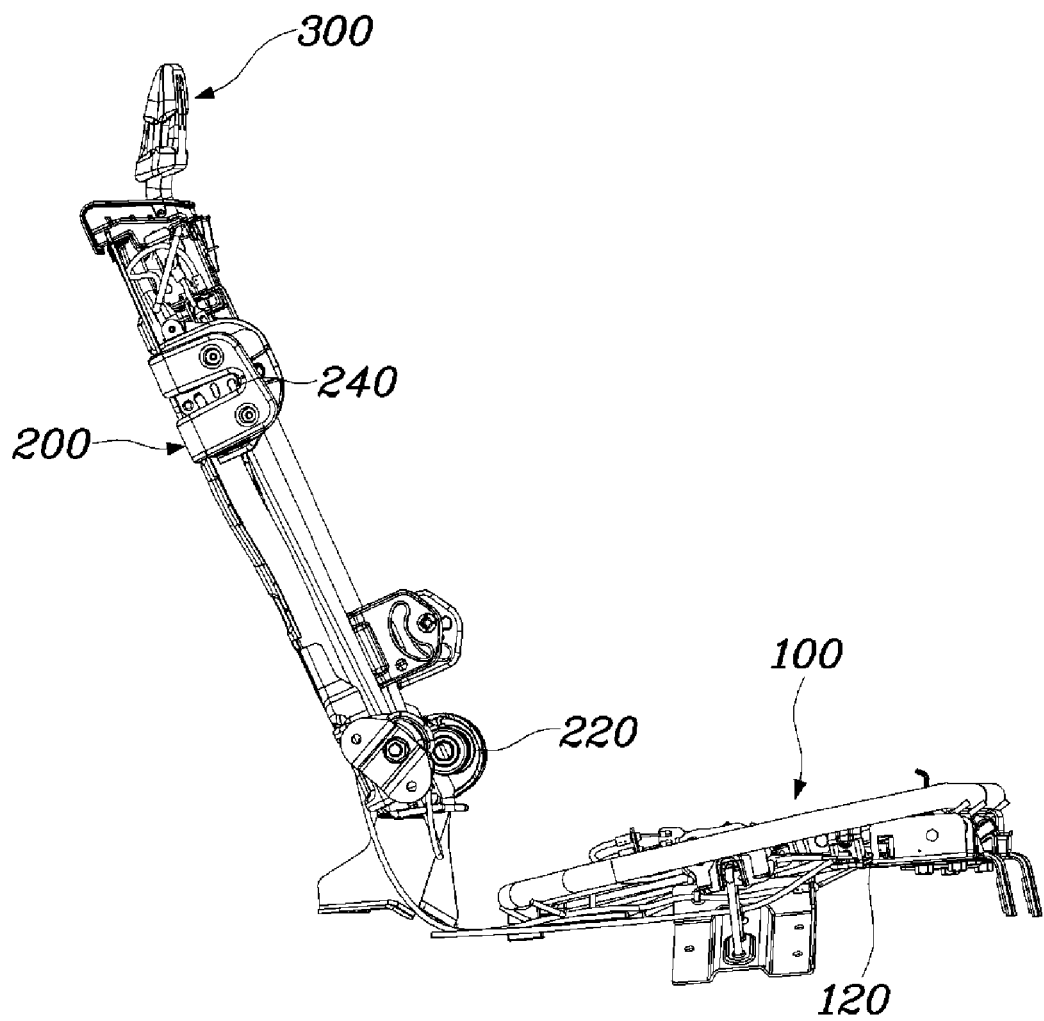
FIG. 4 is a side view of the device of folding a seat for a vehicle illustrated in FIG. 2.
Figure 5:
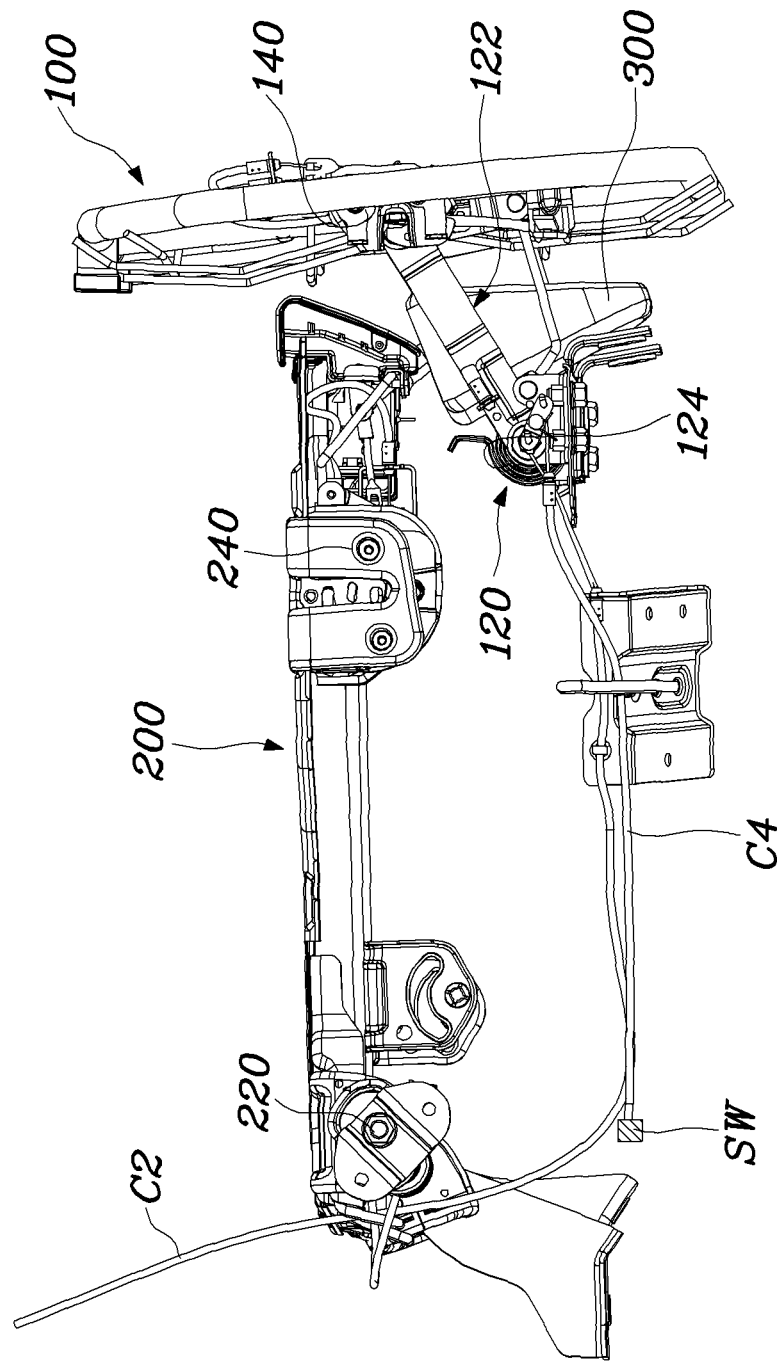
FIG. 5 is a side view illustrating a seat folding state of the device of folding a seat for a vehicle illustrated in FIG. 4.
Figure 6:
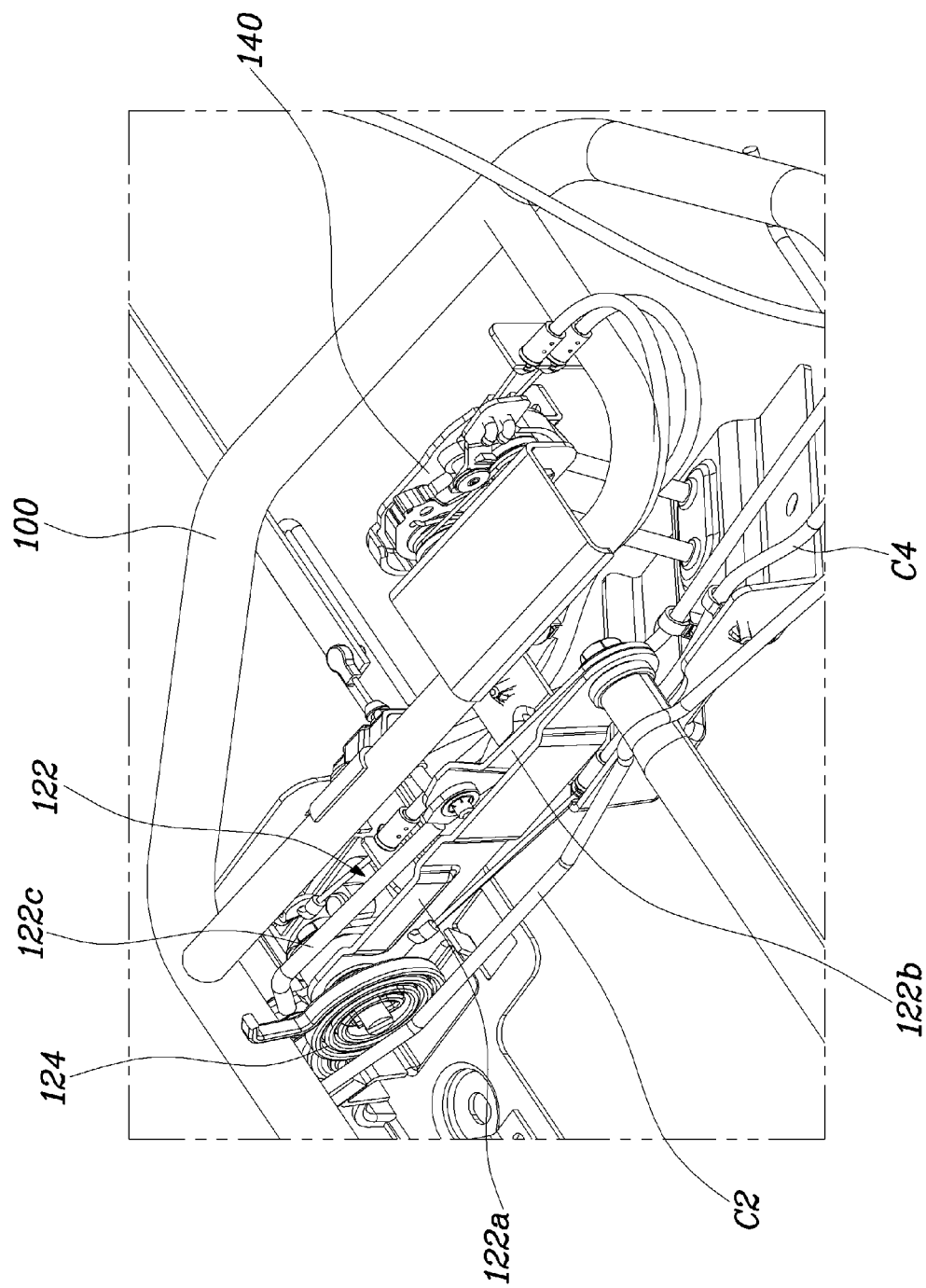
FIG. 6, FIG. 7, FIG. 8 and FIG. 9 are diagrams for describing a rotation mechanism of the device of folding a seat for a vehicle illustrated in FIG. 2.
Figure 7:
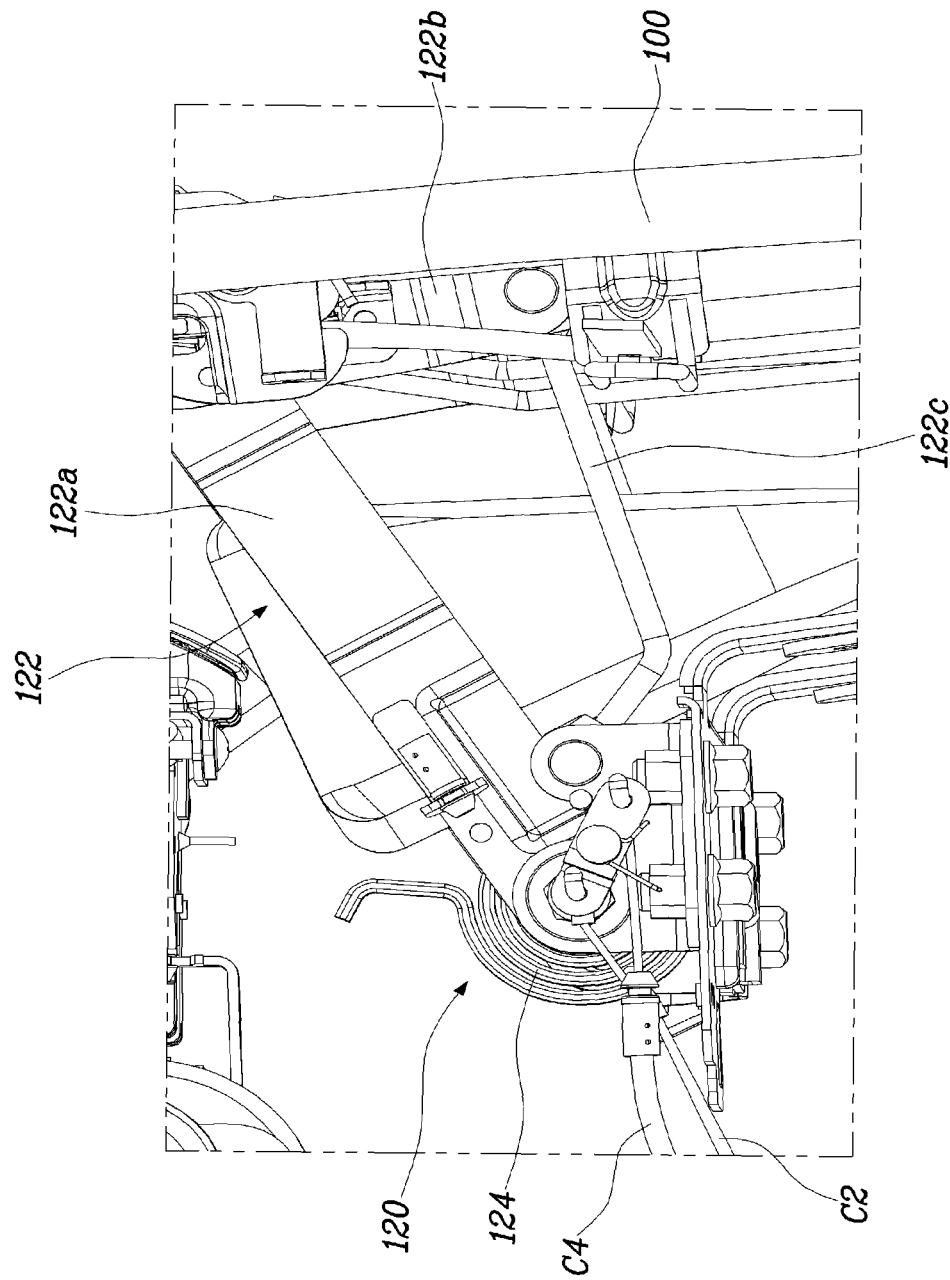

FIG. 2 is a perspective view of a device of folding a seat for a vehicle according to various embodiments of the present invention, FIG. 3 is a front view of the device of folding a seat for a vehicle illustrated in FIG. 2, FIG. 4 is a side view of the device of folding a seat for a vehicle illustrated in FIG. 2, and FIG. 5 is a side view illustrating a seat folding state of the device of folding a seat for a vehicle illustrated in FIG. 4.

Figure 12:
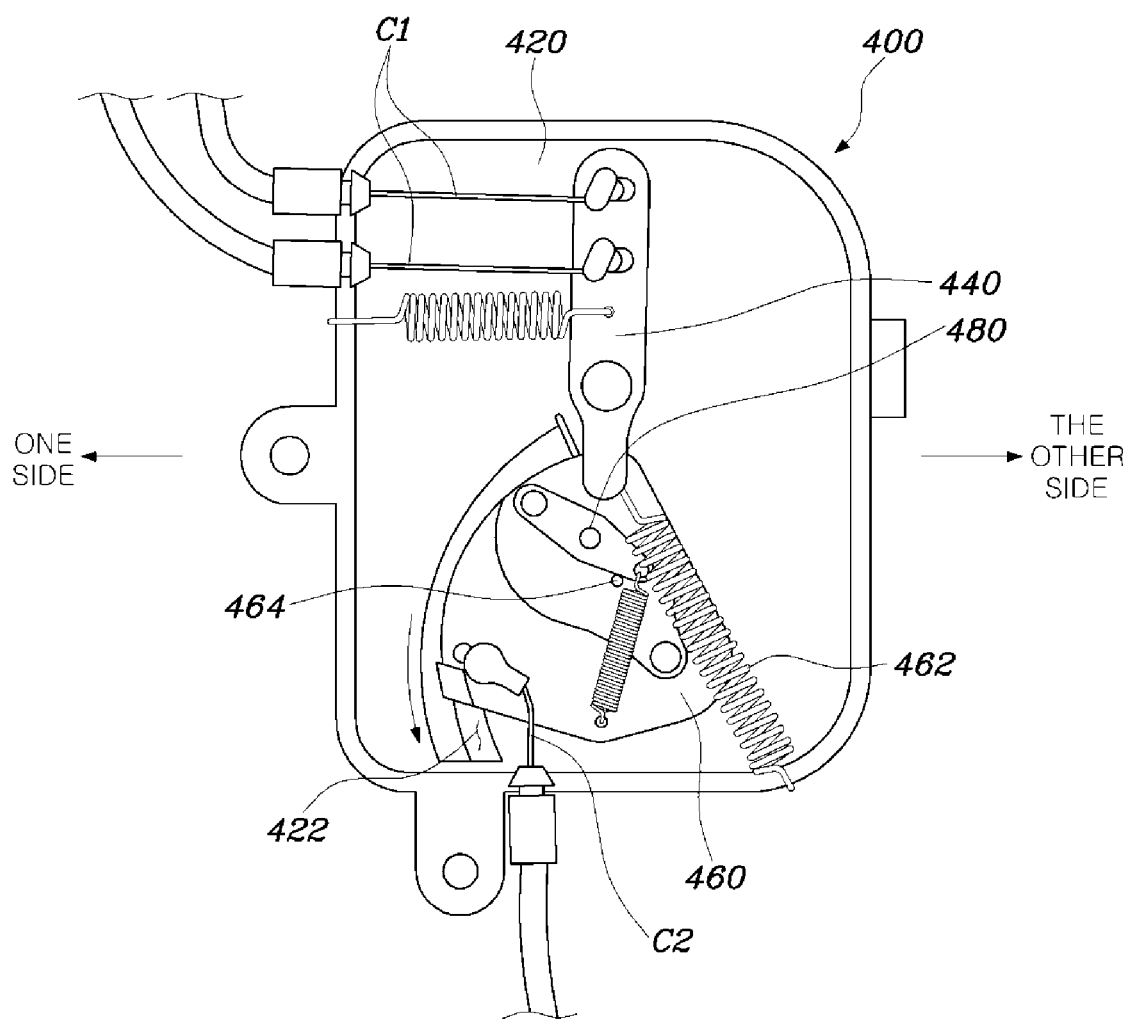
Figure 13:
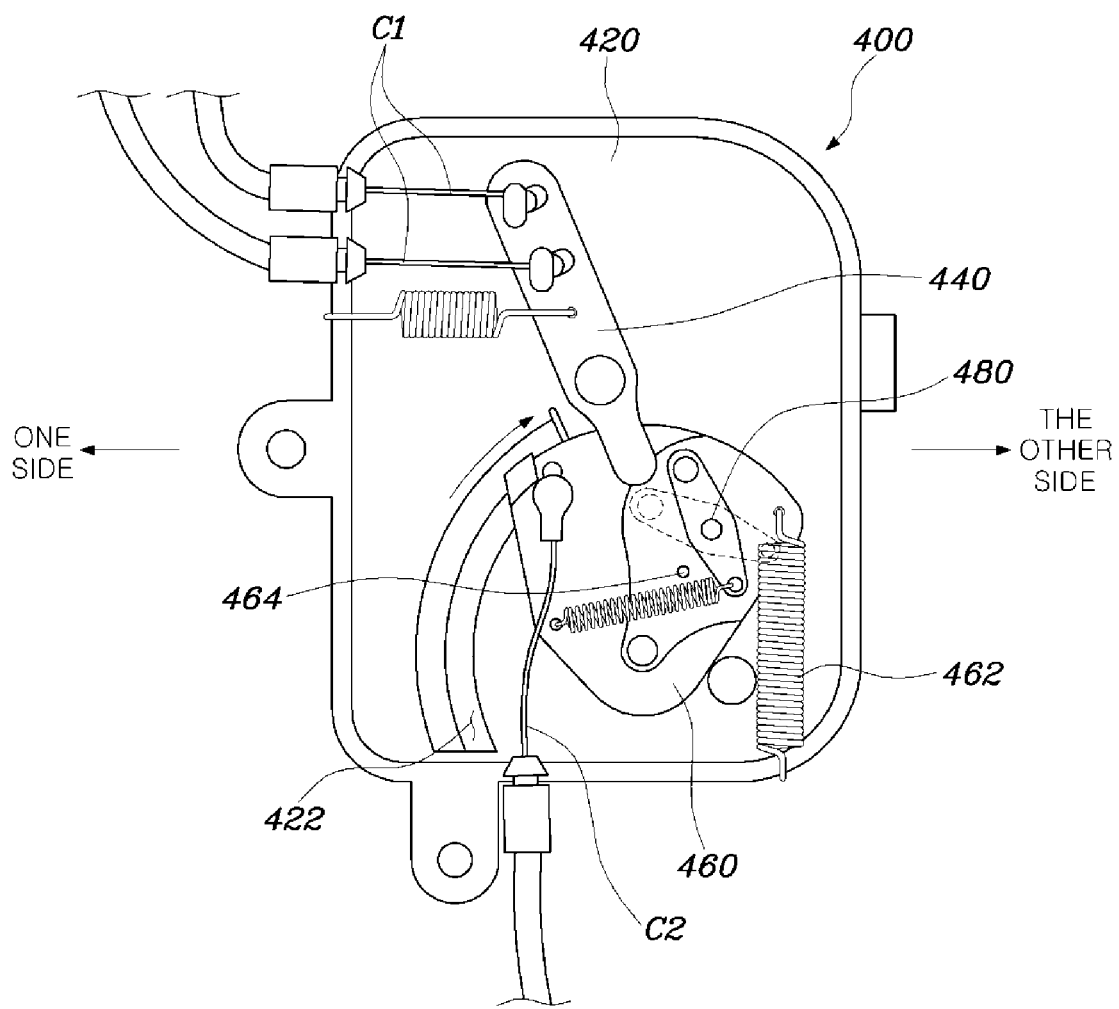
Figure 14:
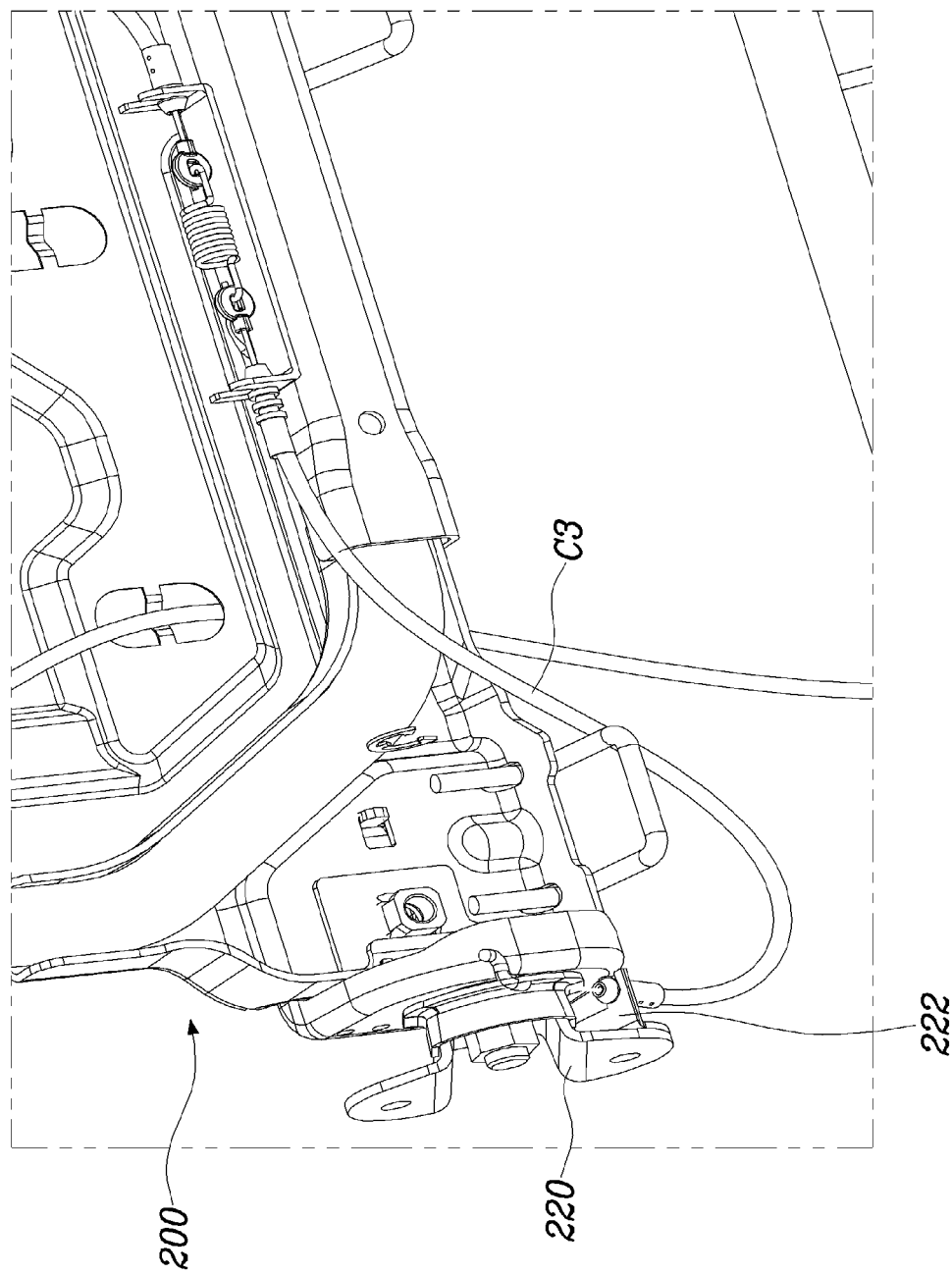
FIG. 14 and FIG. 15 are diagrams for describing a structure of the device of folding a seat for a vehicle when the device of folding a seat for a vehicle illustrated in FIG. 2 is recovered.
Figure 15:
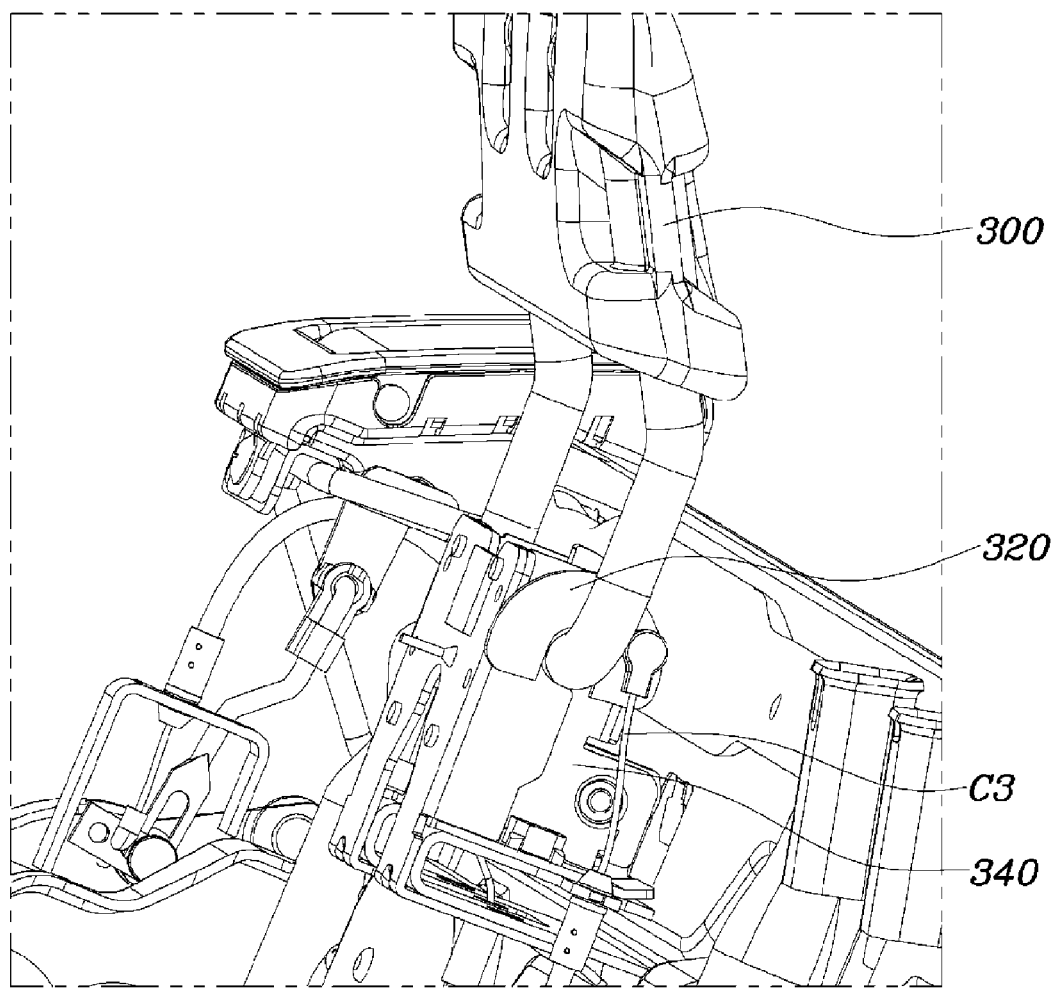

Meanwhile, FIGS. 6 to 9 are diagrams for describing a rotation mechanism of the device of folding a seat for a vehicle illustrated in FIG. 2, FIGS. 10 to 13 are diagrams for describing an operation mechanism of the device of folding a seat for a vehicle illustrated in FIG. 2, and FIGS. 14 to 15 are diagrams for describing a structure of the device of folding a seat for a vehicle when the device of folding a seat for a vehicle illustrated in FIG. 2 is recovered.

In the drawings, to help understanding of the present invention, a seat cushion 100, a seat back 200, and a headrest 300 are illustrated as a seat cushion frame, a seat back frame, and a headrest.

The device of folding a seat for a vehicle according to various embodiments of the present invention includes: a seat cushion 100 configured to be rotatably disposed on a bottom of a vehicle body by a rotation mechanism 120 and provided with a first position fixing mechanism 140 for fixing a position thereof; a seat back 200 configured to be rotatably disposed at a rear of the seat cushion 100 and provided with a second position fixing mechanism 240 for fixing a position thereof; a headrest 300 configured to be rotatably disposed at an upper portion of the seat back 200 and fixed in position by a third position fixing mechanism 340 disposed in the seat back 200; and an operation mechanism 400 configured to be disposed in the seat back 200 and unlock the first position fixing mechanism 140 of the seat cushion 100 to unlock the second position fixing mechanism 240 and the third position fixing mechanism 340 of the seat back 200 at the time of rotating the seat cushion 100 so as to rotate the seat back 200 and the headrest 300.

According to various embodiments of the present invention, the seat cushion 100, the seat back 200, and the headrest 300 may be configured to be folded back and forth. That is, at the time of the folding operation of the seat, the seat cushion 100 rotates forward, the headrest 300 is folded, and then the seat back 200 rotates forward, thereby securing a rear space. The seat cushion 100, the seat back 200, and the headrest 300 are provided with position fixing mechanisms to fix initial positions of each component.

In this configuration, both of the first and second position fixing mechanisms 140 and 240 may be applied with latch apparatuses and selectively connected to a striker disposed in a vehicle to be able to fix the positions of the seat cushion 100 and the seat back 200 and the third position fixing mechanism 340 is selectively connected to a striker disposed inside the seat back 200 to be able to fix a position of the headrest 300.

According to various embodiments of the present invention, the operation mechanism 400 performs the unlocking operations of all the position fixing mechanisms at the time of the folding operation of the seat to simultaneously fold the seat cushion 100, the seat back 200, and the headrest 300. That is, when the operation of folding the seat is performed, the first position fixing mechanism 140 is unlocked to perform a rotation operation of the seat cushion 100 and in connection with the operation, the second position fixing mechanism 240 and the third position fixing mechanism 340 are unlocked by the operation mechanism 400 to rotate the seat back 200 and the headrest 300.

Here, the seat cushion 100 may be provided with an operation part SW for operating the seat folding and the operation part SW is connected to the first position fixing mechanism 140 through an operation cable C4 to lock or unlock the first position fixing mechanism 140 at the time of operating the operation part SW.

As the operation part SW, the lever may be used, but any member which may pull the operation cable C4 by the operation may be variously applied, in which the operation part SW is in some embodiments preferably disposed at a rear of the seat cushion 100 to enable a passenger to easily operate the operation part SW.

Figure 9:
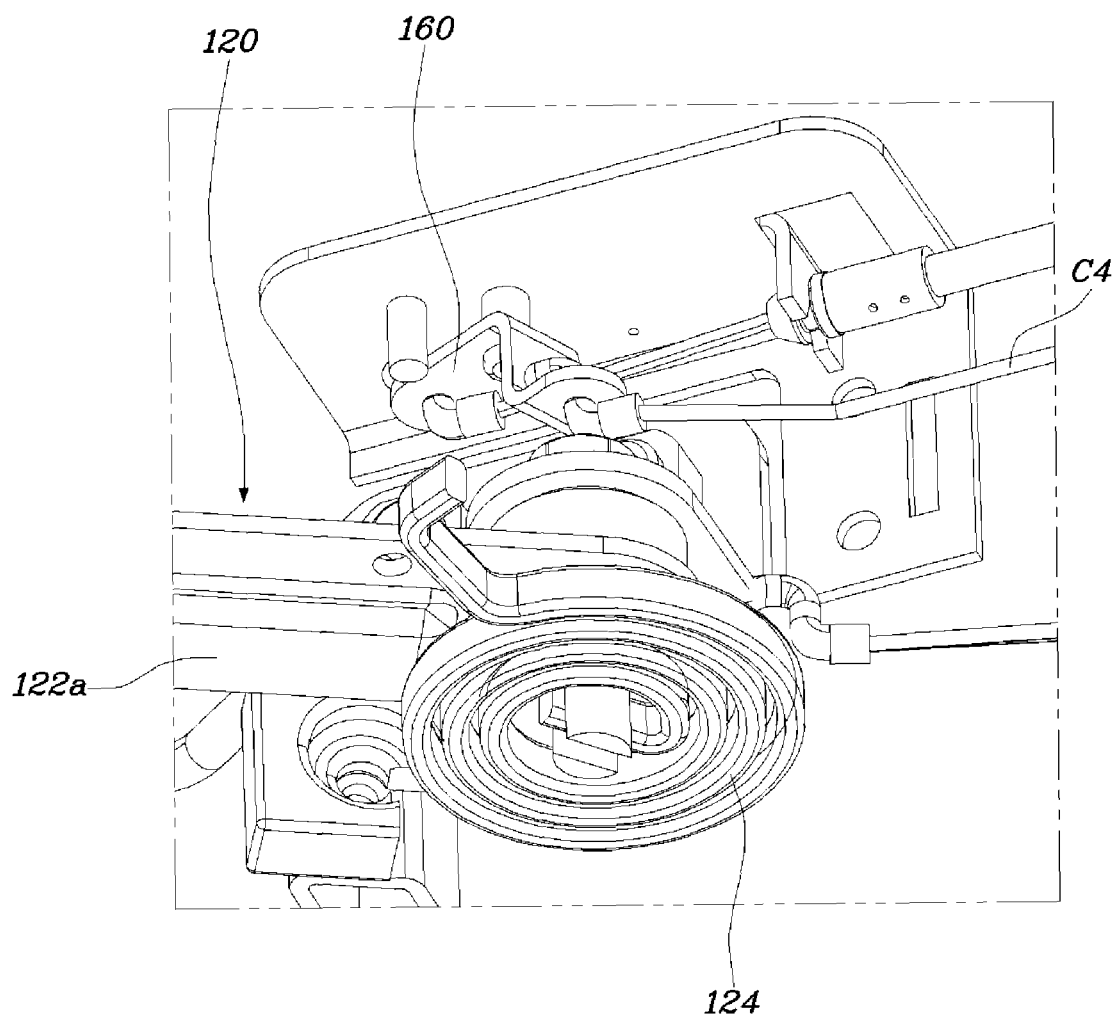

According to various embodiments of the present invention, since the first position fixing mechanism 140 is disposed at the seat cushion 100, as illustrated in FIG. 9, the operation cable C4 extending from the operation part SW is connected to pass through a rotation link 160 which is hinge-connected to the seat cushion 100 to change a direction of a pulling force in response to the operation of the operation part SW, thereby smoothly performing the operation of the first position fixing mechanism 140.

As such, according to various embodiments of the present invention, when the operation part SW is operated, only the first position fixing mechanism 140 is unlocked to perform the rotation operation of the seat cushion 100 and interlocks with the rotating seat cushion 100 to unlock the second position fixing mechanism 240 and the third position fixing mechanism 340 so as to rotate the seat cushion 100, such that the folding operation of the seat back 200 and the headrest 300 is performed.

Describing in detail some embodiments of the present invention, as illustrated in FIGS. 5 to 8, the rotation mechanism 120 may include: a rotation linkage 122 configured to be disposed under a front of the seat cushion 100 and formed of a plurality of links; and an operation part 124 configured to be connected to the links configuring the rotation linkage 122 to provide an operating force so as to rotate the seat cushion 100.

That is, as the rotation mechanism 120 is disposed in front of the seat cushion 100, a rear end of the seat cushion 100 is configured to rotate forward based on the rotation mechanism 120. Here, the rotation linkage 122 is configured of a plurality of links and is applied with the operating force of the operation part 124 to rotate the links.

Figure 8:
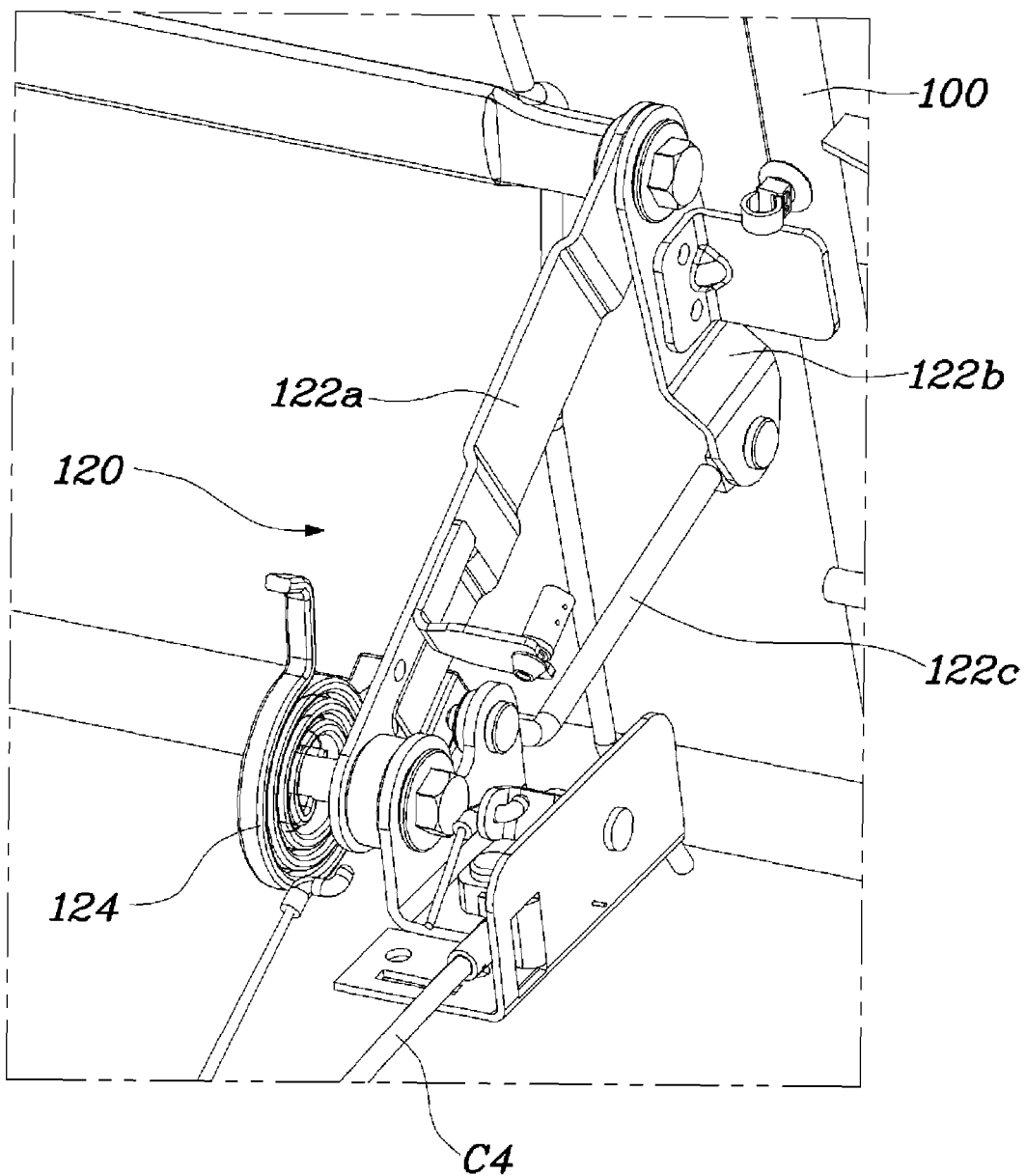

As illustrated in FIG. 8, the rotation linkage 122 may include a first link 122a configured to have one end hinge-connected to the bottom of the vehicle body and the other end connected to a lower end of the seat cushion 100 and be applied with an operating force of the operation part 124 so as to rotate back and forth, a second link 122b configured to have one end hinge-connected to the other end of the first link 122a and the other end extending from a lower end of the seat cushion 100 to be fixed, and a third link 122c configured to have one end hinge-connected to the bottom of the vehicle body and the other end connected to the other end of the second link 122b and rotate along with the rotation of the first link 122a to support the second link 122b.

That is, when the first link 122a rotates by being applied with the operating force from the operation part 124, the second link 122b fixed to the seat cushion frame is pushed to rotate, thereby rotating the seat cushion 100. In this configuration, the second link 122b is connected to the third link 122c to be supported, such that the seat cushion 100 rotates in a safer link structure.

As the operation part 124, a spring member providing an elastic force to rotate the seat cushion 100 forward may be used. The elastic force of the spring member needs to have a strong elastic force which may sufficiently rotate the seat cushion 100, in which a direction of the elastic force needs to be set to rotate the seat cushion 100 forward when the first position fixing mechanism 140 is unlocked. As another example of the operation part 124, a motor may be used to rotate the seat cushion 100.

Meanwhile, the operation mechanism 400 to unlock the second position fixing mechanism 240 and the third position fixing mechanism 340 at the time of the rotation movement of the seat cushion 100 may include: a base bracket 420 configured to be fixed inside the seat back 200; a latch bracket 440 configured to be hinge-connected to an upper end of the base bracket 420 and be connected to latch cables C1 extending from the second position fixing mechanism 240 and the third position fixing mechanism 340, respectively, which are provided in the seat back 200; a release bracket 460 configured to be hinge-connected to a lower end of the base bracket 420 and be connected to a release cable C2 extending from the seat cushion 100 to rotate by a pulling force of the release cable C2 when the seat cushion 100 rotates; and a return bracket 480 configured to be hinge-connected to an upper end of the release bracket 460 and contact the latch bracket 440 at the time of the rotation of the release bracket 460.

Conventionally, the unlocking operation needs to be operated three times for the folding operation of the seat cushion 100, the seat back 200, and the headrest 300, but according to various embodiments of the present invention, the folding operation of the seat cushion 100, the seat back 200, and the headrest 300 is performed by performing the unlocking operation just once.

That is, as illustrated in FIGS. 10 to 13, at the time of the rotation of the seat cushion 100 provided with the first position fixing mechanism 140, the release cable C2 which is connected to the seat cushion 100 and the release bracket 460 is pulled and thus the release bracket 460 rotates. In this case, the return bracket 480 provided with the release bracket 460 contacts the latch bracket 440 and pushes and rotates the latch bracket 440 to pull the latch cable C1 connected to the latch bracket 440, thereby performing the unlocking operation of the second position fixing mechanism 240 and the third position fixing mechanism 340.

Figure 10:
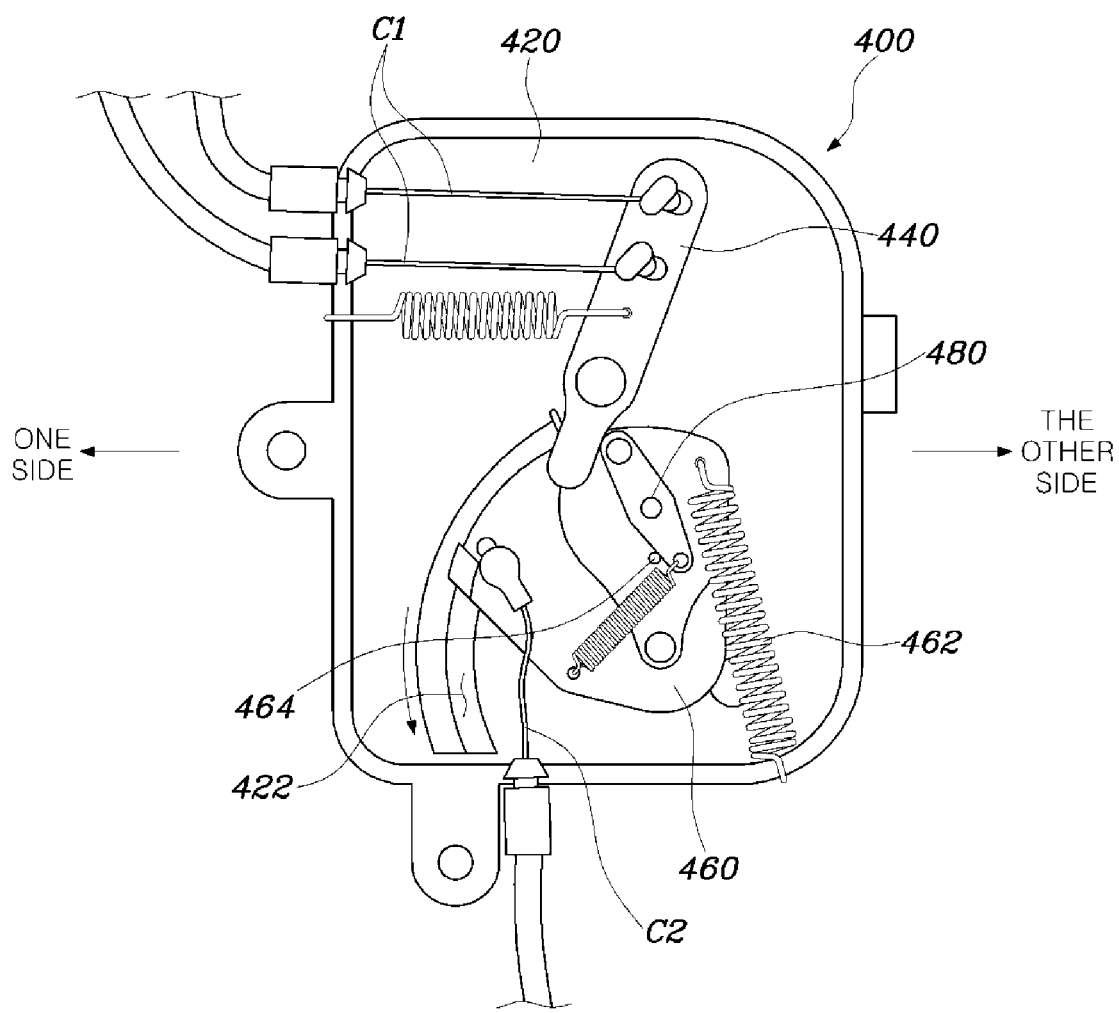
FIG. 10, FIG. 11, FIG. 12 and FIG. 13 are diagrams for describing an operation mechanism of the device of folding a seat for a vehicle illustrated in FIG. 2.
Figure 11:
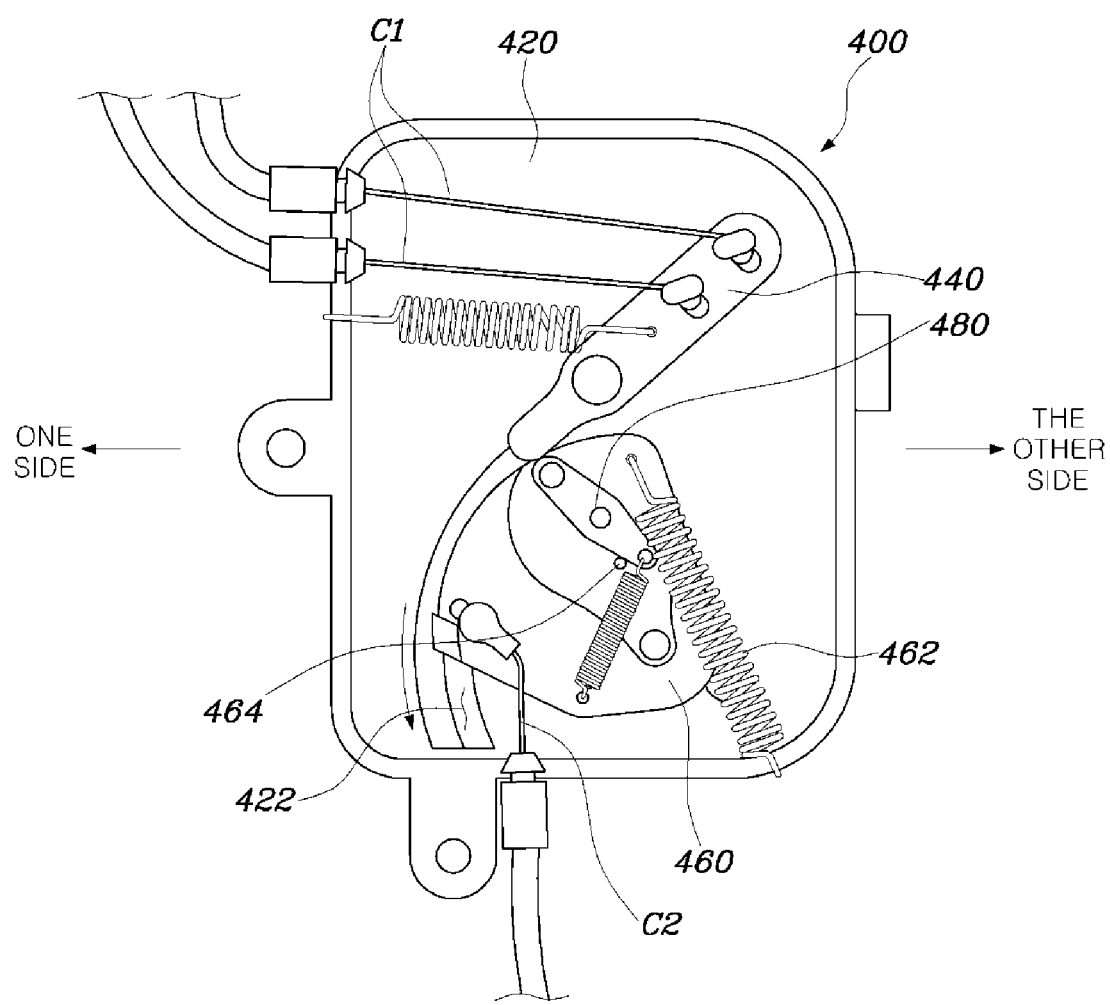

As sequentially illustrated in FIGS. 10 to 12, when the release bracket 460 rotates by a predetermined amount in response to the rotation of the seat cushion 100, the return bracket 480 goes over the latch bracket 440 to return the latch bracket 440 to an original position, thereby performing the locking operation of the third position fixing mechanism 340 again. By doing so, the locking operation of the third position fixing mechanism 340 is performed to fix the position of the headrest 300 so as to perform an original returning operation of the seat back 200 without interference at the time of the return operation to the initial position and first return the seat back 200 to an original position and then return the headrest 300 to an original position.

In detail, the base bracket 420 is provided with a guide 422 extending along a rotation radius of the release bracket 460 and thus the release bracket 460 may rotate along a formation path of the guide 422.

Therefore, the release bracket 460 is limited to rotate as much as the guide 422 formed in the base bracket 420 at the time of the rotation of the release bracket 460, such that the excessive rotation of the release bracket 460 may be limited and the rotation operation of the release bracket 460 may be smoothly performed along the guide 422.

In some embodiments, one end of the release bracket 460 may be connected to the release cable C2 extending from the seat cushion 100 and the other end thereof may be connected to a recovering member 462 fixed to the base bracket 420.

Therefore, as the seat cushion 100 rotates, a pulling force is generated in the release cable C2 to rotate the release bracket 460 in one direction, such that the latch bracket 440 rotates. Further, the other end of an opposite side of the release bracket 460 connected to the release cable C2 is connected to the recovering member 462, and thus when the seat cushion 100 returns to the original position, as the pulling force of the release cable C2 is removed, the release bracket 460 may return to the original position by the elastic recovering force of the recovering member 462. Here, as the recovering member 462, a recovering spring may be applied.

In some embodiments, the release bracket 460 is provided with a protruded stopper 464 to limit the rotation of the return bracket 480 in other direction. That is, as illustrated in FIGS. 10 to 12, as the seat cushion 100 rotates, the recovering bracket contacts the latch bracket 440 when the release bracket 460 rotates in one direction. In this case, the rotation of the return bracket 480 is limited by the stopper 464, and thus the latch bracket 440 is pushed and when the release bracket 460 rotates beyond predetermined amount, the return bracket 480 goes over the latch bracket 440 to completely come over to one side.

As illustrated in FIG. 13, as the rotation operation of the seat cushion 100 returning to the original position is performed, when the release bracket 460 rotates to the original position, the return bracket 480 contacts the latch bracket 440 and the return bracket 480 rotates without the interference of the stopper 464, such that the position of the bracket 440 may be maintained and the return bracket 480 comes over to the other side.

According to various embodiments of the present invention, at the time of the folding operation of the seat, the seat cushion 100 is first flipped and then the folding operation of the seat back 200 and the headrest 300 is performed and at the time of the original recovering operation of the seat, the seat back 200 and the headrest 300 return to the original position and then the seat cushion 100 returns to the original position.

If the second position fixing mechanism 240 and the third position fixing mechanism 340 which fix the positions of the seat back 200 and the headrest 300 at the time of the operation are unlocked at the time of the returning of the release bracket 460 in response to the returning of the seat cushion 100, the position fixing of the seat back 200 and the headrest 300 returning to the original position in advance is released and thus the seat back 200 and the headrest 300 may be folded again to prevent the latch bracket 440 from rotating at the time of the returning operation of the release bracket 460. The returning operation will be described below in detail.

An upper end of the latch bracket 440 based on a hinge point is connected to the latch cable C1 extending from the second position fixing mechanism 240 and the third position fixing mechanism 340 and a lower end thereof extends to contact the return bracket 480. Further, the latch bracket 440 may be supported by the elastic spring to be recovered from the rotating position.

That is, a center of the latch bracket 440 is hinge-connected to the base bracket 420 and thus the upper and lower ends of the latch bracket 440 rotate based on the hinge point, and the upper end thereof is connected to the latch cable C1 and the lower end thereof contacts the return bracket 480 to rotate the upper end from one side to the other side when the lower end thereof rotates from the other end to one side due to the pushing of the return bracket 480 at the time of the rotation of the release bracket 460, such that the latch cable C1 may be pulled.

Meanwhile, describing the recovering of the seat cushion 100, the seat back 200, and the headrest 300 according to various embodiments of the present invention, as illustrated in FIGS. 3, 14 and 15, the seat back 200 is rotatably disposed by the hinge bracket 220 and may be provided with a return cable C3 of which the one end is connected to the hinge bracket 220 to pull the seat back 200 when the seat back 200 returns to the original position and the other end is connected to the headrest 300 to pull the headrest 300 when the seat back returns to the original position so as to return the headrest 300 to the original position.

Here, the hinge bracket 220 may be a recliner and the seat back 200 is configured to rotate back and forth. The hinge bracket 220 is connected to one end of the return cable C3 and the other end of the return cable C3 is connected to the headrest 300 to interlock with the seat back 200 at the time of the rotation of the seat back 200 to rotate the headrest 300.

That is, when the seat again returns to the original position in the state in which the seat is folded, the return cable C3 connected to the hinge bracket 220 is pulled by rotating at the time of the returning operation of the seat back 200 and as the return cable C3 is pulled, the headrest 300 is pulled and rotates and thus the headrest 300 rotates to the original position.

In detail, as illustrated in FIGS. 14 and 15, the hinge bracket 220 is provided with a flange 222 rotating simultaneously with the seat back 200 and one end of the return cable C3 may be connected to the flange 222 and the other end thereof may be connected to the rotation lever 320 of the headrest 300.

That is, the flange 222 is disposed in the hinge bracket 220 and is configured to rotate simultaneously with the rotation direction of the seat back 200 at the time of the rotation of the seat back 200 and the flange 222 is connected to one end of the return cable C3 to pull the return cable C3 in response to the rotation of the seat back 200.

Further, the headrest 300 is configured to be provided with the rotation lever 320 as a portion to which a headrest stay is connected and is configured to simultaneously rotate along the rotation direction of the headrest 300 and when the pulling force is generated in the return cable C3 in response to the rotation of the seat back 200, the rotating lever 320 is pulled to perform the rotation of the headrest 300.

As such, the headrest 300 rotates by interlocking with the seat back 200 by the return cable C3, thereby performing the original returning operation of the seat back 200 and the headrest 300.

The operation of the device of folding a seat for a vehicle according to various embodiments of the present invention will be described below.

Describing the operation state of the folding operation of the seat, when the operation part SW disposed at the seat cushion 100 is operated, an operation cable C4 is pulled and thus the first position fixing mechanism 140 is unlocked. As such, when the first position fixing mechanism 140 is unlocked, the rotation of the seat cushion 100 is performed by the rotation mechanism 120 disposed in the seat cushion 100 and the pulling force is generated in the release cable C2 connected to the seat cushion 100 to rotate the release bracket 460 of the operation mechanism 400. As a result, the return bracket 480 disposed in the release bracket 460 pushes and rotates the latch bracket 440 and the latch cable C1 connected to the latch bracket 440 is pulled to unlock the second position fixing mechanism 240 and the third position fixing mechanism 340, thereby performing the rotation operation of the seat back 200 and the headrest 300.

Describing the operation state at the time of the recovering operation of the seat, the seat back 200 first rotates and the pulling force is generated in the return cable C3 connected to the hinge bracket 220 in response to the rotation of the seat back 200 to return the headrest 300 to the original position. By doing so, when the returning operation of the seat back 200 and the headrest 300 is performed and then the seat cushion 100 returns to the original position, the pulling force of the release cable C2 is removed and thus the release bracket 460 rotates to the original position by the recovering force of the recovering member 462 and the return bracket 480 rotates contacting the latch bracket 440 to go over without the interference with the latch bracket 440. As the result, the unlocking operation of the second position fixing mechanism 240 and the third position fixing mechanism 340 connected to the latch bracket 440 is not performed and thus the position fixing state of the seat back 200 and the headrest 300 is maintained, thereby returning the seat cushion 100 to the original position.

According to the device of folding a seat for a vehicle of the present invention, it is possible to simultaneously fold the seat cushion 100, the seat back 200, and the headrest 300 by simultaneously unlocking the seat cushion 100, the seat back 200, and the headrest 300 so as to secure the load space of the rear of the vehicle.

For convenience in explanation and accurate definition in the appended claims, the terms "front" or "rear", "lower" or "upper" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A device of folding a seat for a vehicle, comprising:
   a seat cushion configured to be rotatably disposed on a bottom of a vehicle body and rotatable by a rotation mechanism and provided with a first position fixing mechanism for fixing a position thereof;
   a seat back configured to be rotatably disposed at a rear of the seat cushion and provided with a second position fixing mechanism for fixing a position thereof;
   a headrest configured to be rotatably disposed at an upper portion of the seat back and fixed in position by a third position fixing mechanism disposed in the seat back; and
   an operation mechanism configured to be disposed in the seat back and which unlocks the first position fixing mechanism to unlock the second position fixing mechanism and the third position fixing mechanism at a time of rotating the seat cushion so as to rotate the seat back and the headrest,
   wherein the operation mechanism includes:
      a base bracket configured to be fixed inside the seat back;
      a latch bracket configured to be hinge-connected to an upper end of the base bracket and be connected to latch cables extending from the second position fixing mechanism and the third position fixing mechanism, respectively, which are provided in the seat back;
      a release bracket configured to be hinge-connected to a lower end of the base bracket and be connected to a release cable extending from the seat cushion to rotate by a pulling force of the release cable when the seat cushion rotates; and
      a return bracket configured to be hinge-connected to an upper end of the release bracket and contact the latch bracket at the time of the rotation of the release bracket.

2. The device of claim 1, wherein the rotation mechanism includes:
   a rotation linkage configured to be disposed under a front of the seat cushion and to include a plurality of links; and
   an operation part configured to be connected to the links to provide an operating force so as to rotate the seat cushion.

3. The device of claim 2, wherein the plurality of the links includes:
   a first link configured to have one end hinge-connected to the bottom of the vehicle body and the other end connected to a lower end of the seat cushion and being applied with the operating force of the operation part so as to rotate back and forth;
   a second link configured to have one end hinge-connected to the other end of the first link and the other end extending from the lower end of the seat cushion to be fixed; and
   a third link configured to have one end hinge-connected to the bottom of the vehicle body and the other end connected to the other end of the second link, and to rotate along with the rotation of the first link to support the second link.

4. The device of claim 2, wherein the operation part includes a spring member providing an elastic force to rotate the seat cushion forward.

5. The device of claim 1, wherein the base bracket is provided with a guide extending along a rotation radius of the release bracket and the release bracket rotates along a formation path of the guide.

6. The device of claim 1, wherein one end of the release bracket is connected to the release cable extending from the seat cushion and the other end thereof is connected to a recovering member fixed to the base bracket.

7. The device of claim 1, wherein the release bracket is provided with a protruded stopper to limit the rotation of the return bracket in one direction.

8. The device of claim 1, wherein an upper end of the latch bracket is connected to the latch cables each extending from the second position fixing mechanism and the third position fixing mechanism, and a lower end thereof extends to contact the return bracket.

9. The device of claim 1, wherein the seat back is rotatably disposed by a hinge bracket and is provided with a return cable, of which one end is connected to the hinge bracket to pull the return cable when the seat back returns to an original position of the seat back and another end is connected to the headrest to pull the headrest, when the seat back returns to the original position of the seat back, to return the headrest to an original position of the headrest.

10. The device of claim 9, wherein the hinge bracket is provided with a flange rotating simultaneously with the seat back and the one end of the return cable is connected to the flange and the other end thereof is connected to a rotation lever of the headrest.

11. The device of claim 1, wherein the seat cushion is provided with an operation part to lock or unlock the first position fixing mechanism and the operation part is connected to the first position fixing mechanism through an operation cable.

* * * * *